United States Patent Office 3,418,288
Patented Dec. 24, 1968

3,418,288
POLYMERIC COMPOSITIONS FROM ETHYL-
ENEDIAMINETETRAACETIC ACID AND
HEXAMETHYLENEDIAMINE
Roger F. Monroe, Midland, Mich., assignor to The Dow
Chemical Company, Midland, Mich., a corporation of
Delaware
No Drawing. Filed Aug. 27, 1964, Ser. No. 392,590
4 Claims. (Cl. 260—78)

ABSTRACT OF THE DISCLOSURE

This invention relates to a process for preparing a condensation polymer which is especially well suited for use as adherent coatings for electrically heated wires and the like substrates. Such process comprises the reaction of approximately equal molar amounts of (ethylenedinitrilo)tetraacetic acid and hexamethylenediamine, while dispersed in an inert liquid media, at a temperature between about 200° C. and 300° C. until at least about two moles of water are formed per mole of either of such reactants.

---

The polymeric materials of the present invention may be prepared by the dispersion of the required starting materials in water in a suitable pressure vessel and caused to polymerize at elevated temperatures preferably temperatures between about 185° C. to 285° C. under steam pressure, for a period of from about 16 to 24 hours. Following reaction, the so-formed polymeric material may then be extruded directly from the pressurized reaction vessel in a manner well known in the polyamide polymer producing art.

Alternatively, the polymeric materials of the invention may be prepared by refluxing the required amounts of starting material in a suitable inert solvent, such as petroleum ether having a boiling point of from about 200 to 325° C., wherein the water given off as a byproduct during reaction, as an azeotropic mixture with the refluxing solvent, is a convenient determinant of the extent of the reaction.

It is essential for the purposes of this invention that approximately equal molar amounts of (ethylenedinitrilo) tetraacetic acid and hexamethylenediamine are employed, and that such materials are caused to react until at least about two moles of water, per mole of either reactant, are obtained. In this regard, it has been found that an excess of about 10 percent of either reactant, or dehydration in amount to produce significantly less than at least about two moles of water per mole of either reactant, will seriously hinder formation of the polymeric materials as contemplated by the present invention.

The polymers of the invention are relatively hard, cross-linkable materials having high heat distortion properties. Such materials may be shaped and molded into tough, flexible fibers and films or cast into self-supporting films, e.g., when pressed at about 300 to 400° C., the polymers have good fluidity and yield molded pieces of good homogeneity and strength.

Another particularly valuable application of such polymers is their utilization as adherent, heat-resistant coatings for substrates such as electrically heated wires and the like. In such application the polymers may be applied directly in molten form or from solution in a suitable solvent.

It has further been found that the products of the present invention may be further modified if desired by the addition thereto of glycerine or glycols to render the same more water-soluble or by compounding such polymers with cross-linking agents such as benzoyl peroxide and applying heat and pressure to cure and thermoset the product.

The following examples, wherein all parts and percentages are to be taken by weight, are intended to illustrate the invention but are not be to construed as limiting its scope.

Example 1

A mixture of 1 mole of (ethylenedinitrilo)tetraacetic acid and 1 mole of hexamethylenediamine was refluxed in 300 cc. of petroleum ether having a boiling point of about 250 to 325° C. under atmospheric pressure for a period of about 16 hours, during which time two moles of water were recovered as water of condensation. The resulting so-formed polymeric product was a grey, somewhat brittle solid having a softening point of about 250 to 300° C. The so-formed polymer was capable of being compression molded at a temperature of about 300° C. to produce a tough, flexible film.

Example 2

Into a reaction vessel comprising a stainless steel tube having a length of about 6 inches and a diameter of about 2 inches and having a flange at one end holding an extrusion die and a shut-off valve, was added 100 ml. of water, 1 mole of (ethylenedinitrilo)tetraacetic acid and 1 mole of hexamethylenediamine. The pipe was then sealed and heated for 24 hours at 300° C. The shut-off valve was then opened and the so-formed polymeric material obtained as a tough, fiberous material by extrusion through the die opening.

What is claimed is:
1. A process for preparing a condensation polymer which is especially well suited for use as adherent coatings for electrically heated wire and the like substrates comprising essentially: reacting approximately equal molar proportions of (ethylenedinitrilo)tetraacetic acid and hexamethylenediamine while dispersed in an inert liquid media, at a temperature between about 200° C. and 300° C. until at least about two moles of water are formed per mole of either of such reactants.
2. The process of claim 1 wherein said reactants are heated under atmospheric pressure.
3. The process of claim 1 wherein said reactants are heated under superatmospheric pressure.
4. A condensation polymer prepared by the process of claim 1.

References Cited
UNITED STATES PATENTS 2,615,863  10/1952  Glory _____ 260—78
2,794,000  5/1957  Ruedrich _____ 252—51.5

W. H. SHORT, *Primary Examiner.*

H. D. ANDERSON, *Assistant Examiner.*

U.S. Cl. X.R.

260—75, 78.4, 47; 117—161